(12) United States Patent
Hara et al.

(10) Patent No.: US 12,018,353 B2
(45) Date of Patent: *Jun. 25, 2024

(54) DECORATIVE COATING FILM

(71) Applicant: TOYOTA JIDOSHA KABUSHIKI KAISHA, Toyota (JP)

(72) Inventors: Toshimasa Hara, Nisshin (JP); Junya Murai, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 679 days.

This patent is subject to a terminal disclaimer.

(21) Appl. No.: 17/180,143

(22) Filed: Feb. 19, 2021

(65) Prior Publication Data

US 2021/0170481 A1    Jun. 10, 2021

Related U.S. Application Data

(62) Division of application No. 16/225,463, filed on Dec. 19, 2018, now Pat. No. 10,954,398.

(30) Foreign Application Priority Data

Dec. 22, 2017   (JP) ................... 2017-246049

(51) Int. Cl.
*C22C 5/06*     (2006.01)
*B05D 1/00*    (2006.01)
(Continued)

(52) U.S. Cl.
CPC ............... *C22C 5/06* (2013.01); *B05D 1/005* (2013.01); *B22F 1/054* (2022.01); *B22F 1/056* (2022.01);
(Continued)

(58) Field of Classification Search
CPC .... C22C 5/06; C09D 5/38; C09D 7/61; C09D 7/67; C09D 7/68; C09D 7/70;
(Continued)

(56) References Cited

U.S. PATENT DOCUMENTS 10,137,938 B2 * 11/2018 Frayer .................. H01Q 1/3233
10,954,398 B2 *  3/2021 Hara ........................ C09D 7/70
(Continued)

FOREIGN PATENT DOCUMENTS

CN         105658714 A   ‡  6/2016  ............... C22C 5/06
CN         105658714 A      6/2016
(Continued)

OTHER PUBLICATIONS

EPO Machine Translation of KR20180014771A (Year: 2020).‡
(Continued)

*Primary Examiner* — James A Fiorito
*Assistant Examiner* — Ross J Christie
(74) *Attorney, Agent, or Firm* — Sughrue Mion, PLLC

(57) ABSTRACT

The present disclosure provides a decorative coating film, which ensures and/or maintains millimeter wave transmission properties even though the decorative coating film is continuously used. The present disclosure relates to a decorative coating film formed on the surface of a resin substrate positioned in the pathway of a radar device, wherein the decorative coating film at least comprises: fine silver particles or fine silver alloy particles, nickel oxide, and a binding resin having light transmission properties, which binds the fine silver particles or the fine silver alloy particles dispersed in the decorative coating film with one another, wherein the shape of the nickel oxide is a wire shape.

11 Claims, 12 Drawing Sheets

(51) Int. Cl.
  *B22F 1/054* (2022.01)
  *B22F 1/10* (2022.01)
  *B32B 27/08* (2006.01)
  *C08J 7/04* (2020.01)
  *C08J 7/043* (2020.01)
  *C09D 5/38* (2006.01)
  *C09D 7/40* (2018.01)
  *C09D 7/61* (2018.01)
  *B05D 5/06* (2006.01)
  *B22F 9/24* (2006.01)
  *C08K 3/08* (2006.01)
  *C08K 3/22* (2006.01)

(52) U.S. Cl.
  CPC ............... *B22F 1/10* (2022.01); *B32B 27/08* (2013.01); *C08J 7/0427* (2020.01); *C08J 7/043* (2020.01); *C09D 5/38* (2013.01); *C09D 7/61* (2018.01); *C09D 7/67* (2018.01); *C09D 7/68* (2018.01); *C09D 7/70* (2018.01); *B05D 5/061* (2013.01); *B05D 2502/00* (2013.01); *B05D 2601/10* (2013.01); *B05D 2601/28* (2013.01); *B22F 9/24* (2013.01); *B22F 2301/255* (2013.01); *C08K 2003/0806* (2013.01); *C08K 2003/2293* (2013.01)

(58) Field of Classification Search
  CPC .......... C08J 7/0427; C08J 7/043; B22F 1/054; B22F 1/056; B22F 1/10; B22F 9/24; B22F 2301/255; B05D 1/005; B05D 5/061; B05D 2502/00; B05D 2601/10; B05D 2601/28; C08K 2003/0806; C08K 2003/2293
  See application file for complete search history.

(56) References Cited

U.S. PATENT DOCUMENTS

2010/0247870 A1* 9/2010 Suzuki .................. C09D 11/30 427/58
2010/0247878 A1‡ 9/2010 Saito ..................... C09D 11/106 428/20
2011/0291032 A1* 12/2011 Sun ........................ H01F 1/0081 252/514
2015/0359105 A1‡ 12/2015 Yoon ..................... C09D 11/52 428/172
2016/0256891 A1‡ 9/2016 Yoshinaga ............. B05D 1/005
2018/0223108 A1‡ 8/2018 Hara ........................ B44C 1/10

FOREIGN PATENT DOCUMENTS

| CN | 108300153 A | ‡ | 10/2017 | .......... C09D 163/00 |
|---|---|---|---|---|
| CN | 108300153 A | | 7/2018 | |
| DE | 10246607 B4 | * | 8/2014 | ............. G01S 13/86 |
| JP | 2013-024727 A | ‡ | 2/2013 | |
| JP | 2013-024727 A | | 2/2013 | |
| JP | 2015-080934 A | ‡ | 4/2015 | ............. B05D 1/005 |
| JP | 2015-080934 A | | 4/2015 | |
| JP | 2015-104707 A | | 6/2015 | |
| JP | 2015-104707 A | ‡ | 6/2015 | |
| JP | 2015104707 A | ‡ | 6/2015 | ............... B05D 5/12 |
| JP | 2018-128341 A | | 8/2018 | |
| JP | 2018-128341 A | ‡ | 8/2018 | ............. B32B 27/08 |
| KR | 20180014771 A | | 2/2018 | |
| KR | 20180014771 A | ‡ | 2/2018 | ............ B22F 1/0007 |

OTHER PUBLICATIONS

Yanagimoto et al, Machine Translation of JP-2015104707-A (Year: 2015).‡
Guo et al, Machine Translation of CN-108300153-A (Year: 2017).‡
Non-Final Office Action dated May 14, 2020 in U.S. Appl. No. 16/225,463.
Final Office Action dated Aug. 21, 2020 in U.S. Appl. No. 16/225,463.
Notice of Allowance dated Nov. 25, 2020 in U.S. Appl. No. 16/225,463.

\* cited by examiner
‡ imported from a related application

DECORATIVE COATING FILM

CROSS REFERENCE TO RELATED APPLICATIONS

The present application is a divisional of U.S. patent application Ser. No. 16/225,463, filed on Dec. 19, 2018, which claims priority from Japanese patent application JP 2017-246049, filed on Dec. 22, 2017, the contents of all of which are incorporated herein by reference in their entireties.

BACKGROUND

Technical Field

The present disclosure relates to a decorative coating film formed on the surface of a resin substrate, in which fine particles of metal or alloy are bound to one another by a resin having light transmission properties.

Background Art

Conventionally, a vehicle such as an automobile is equipped with a radar device such as a millimeter wave radar in the central position of the front part thereof, in order to measure the distance from a forward obstacle or a forward vehicle. In such a radar device, an electrical wave irradiated from the radar device, such as a millimeter wave, is emitted forward through a front grill or an emblem of the vehicle manufacturer. The emitted electrical wave is reflected at an object such as a forward vehicle or a forward obstacle, and this reflected wave is returned to the radar device through the front grill or the like.

Accordingly, for a portion disposed in the beam pathway of the radar device, such as a front grill or an emblem, a material or a paint, which is capable of reducing electrical wave transmission loss and imparting desired good appearance to the vehicle, is frequently used, and a decorative coating film is generally formed on the surface of a resin substrate.

On the other hand, since a silver coating film has high visible light transmittance and is excellent in terms of infrared shielding property, the silver coating film has been conventionally used for various types of intended uses. Moreover, since such a silver coating film is also excellent in terms of electrical wave shielding property, for example, the silver coating film is able to protect electronic devices causing malfunction due to electrical wave from external electrical wave, or to suppress the irradiation of electrical wave generated from the electronic devices. Thus, the silver coating film is also used as an electrical wave shielding film.

For instance, JP 2015-080934 A proposes a decorative coating film, which comprises fine silver alloy particles dispersed in the decorative coating film, and a binding resin having light transmission properties, which acts to bind the fine silver alloy particles to one another. Such fine silver alloy particles comprised in the decorative coating film consist of an alloy consisting of silver and nickel, and the fine silver alloy particles have nickel in an amount range of 1% by mass to 30% by mass with respect to the mass of sliver.

SUMMARY

However, it has been found that, in the case of the conventional decorative coating film, the electrical wave (millimeter wave) transmission properties of the decorative coating film are significantly decreased due to the continued use.

The present disclosure has been made in view of such a point, and the present disclosure provides a decorative coating film capable of ensuring and/or maintaining millimeter wave transmission properties, even after the continued use thereof.

As a result of intensive studies, the present inventors have thought that the millimeter wave transmission properties of the decorative coating film are easily decreased on the surface of fine silver particles, or fine particles consisting of a silver-nickel alloy or a silver-zinc alloy (fine silver alloy particles), due to the influence of surface plasmon resonance absorption. Specifically, the present inventors have thought that, as shown in FIG. 11A, when fine silver particles or fine silver alloy particles are irradiated with light, the fine silver particles or the fine silver alloy particles are vibrated by light energy, and free electrons inside them move, so that the fine silver particles or the fine silver alloy particles are easily polarized.

Thus, the present inventors have thought that, as shown in FIG. 11B, surface electromagnetic wave called "surface plasmon polariton" is easily generated on the surface of fine silver particles or fine silver alloy particles, and that a specific wavelength of light is absorbed, and the energy of the fine silver particles or the fine silver alloy particles is easily amplified (surface plasmon resonance absorption). The inventors have thought that a constitutional substance (binding resin) present around the fine silver particles or fine silver alloy particles thereby become brittle by the influence of such amplification energy, and the fine silver particles or the fine silver alloy particles move and/or aggregate, and are allowed to come into contact with one another, so that conduction occurs and transmission of a millimeter wave is inhibited.

Hence, the present inventors have focused on a substance capable of reinforcing a constitutional substance (binding resin) present around fine silver particles or fine silver alloy particles in a decorative coating film. The present inventors have assumed that, by allowing the decorative coating film to comprise a substance capable of reinforcing a constitutional substance that is present around the fine silver particles or the fine silver alloy particles, even in the state of the fine silver particles or the fine silver alloy particles easily generating surface plasmon resonance absorption, the transition and/or aggregation of the fine silver particles or the fine silver alloy particles themselves are suppressed and the millimeter wave transmission properties of the decorative coating film can be ensured and/or maintained without causing contact between the fine silver particles or the fine silver alloy particles.

The present disclosure has been made in view of such a point, and the present disclosure relates to a decorative coating film formed on the surface of a resin substrate positioned in the pathway of a radar device, wherein the decorative coating film at least comprises: fine silver particles or fine silver alloy particles, nickel oxide, a binding resin having light transmission properties, which binds the fine silver particles or the fine silver alloy particles dispersed in the decorative coating film with one another, wherein the shape of the nickel oxide is a wire shape.

According to the present disclosure, since the decorative coating film has a structure which at least comprises fine silver particles or fine silver alloy particles dispersed in the decorative coating film, and a binding resin having light transmission properties, which binds the dispersed fine silver particles or fine silver alloy particles with one another, the decorative coating film can be a coating film having electrical wave transmission properties and electrical insulation, and also apparently having metallic luster.

Moreover, in the decorative coating film according to the present disclosure, nickel oxide having a wire shape is dispersed. In some embodiments, the aspect ratio of such a wire shape is 3 or more, and the wire diameter of the wire shape is 1 nm to 20 nm. Thus, when compared with a decorative coating film that does not comprise such nickel oxide having a wire shape, or a decorative coating film comprising nickel oxide having another shape, the present decorative coating film comprising nickel oxide having a wire shape is reinforced, and the transition and/or aggregation of the fine silver particles or the fine silver alloy particles are suppressed, and the embrittlement of the binding resin is suppressed, so that the millimeter wave transmission properties of the decorative coating film can be ensured and/or maintained without causing contact between the fine silver particles or the fine silver alloy particles when the present decorative coating film is continuously used, even in the state of fine silver particles or fine silver alloy particles easily generating surface plasmon resonance absorption.

Herein, when the decorative coating film does not comprise the above-described nickel oxide, or when the decorative coating film comprises nickel oxide having another shape instead of the above-described nickel oxide, a constitutional substance that is present around the fine silver particles or the fine silver alloy particles may become brittle by receiving amplification energy caused by the influence of surface plasmon resonance absorption as a result of long-term outdoor exposure, and thereby, the fine silver particles or the fine silver alloy particles may move and/or aggregate and thus, may be contacted one another to generate conduction, so that transmission of a millimeter wave may be inhibited.

In some embodiments, the amount of the nickel oxide having a wire shape according to the present disclosure is 1.5% by mass to 35.0% by mass as nickel with respect to the mass of silver. The amount of the nickel oxide according to the present disclosure is 1.5% by mass or more as nickel with respect to the mass of silver, so that the effects of continuously ensuring and/or maintaining the above-described millimeter wave transmission properties can be sufficiently exhibited, and the attenuation of a millimeter wave after a weathering test can be maintained at a small level. On the other hand, the amount of the nickel oxide according to the present disclosure is 35.0% by mass or less as nickel with respect to the mass of silver, so that a reduction in the brightness of the decorative coating film can be suppressed, and the metallic luster of the decorative coating film can be ensured without being impaired.

In some embodiments, the mean particle diameter (mean primary particle diameter) of the fine silver particles or the fine silver alloy particles according to the present disclosure is 2 nm to 200 nm. When the mean particle diameter of the fine silver particles or the fine silver alloy particles is within this range, light is easily absorbed by the fine particles as a result of a phenomenon called "surface plasmon resonance absorption." However, even in this embodiment, the decorative coating film is reinforced because of the presence of the nickel oxide having a wire shape in the decorative coating film, and even in the case of using the fine silver particles or the fine silver alloy particles having such a size, a reduction in the millimeter wave transmission properties of the decorative coating film can be suppressed.

When the mean particle diameter of the fine silver particles or the fine silver alloy particles is greater than 200 nm, irregular reflection of light is easily generated by the fine silver particles or the fine silver alloy particles, and thereby, silver luster is easily decreased. On the other hand, when the mean particle diameter of the fine silver particles or the fine silver alloy particles is less than 2 nm, light made incident to the decorative coating film is hardly reflected.

In some embodiments, the fine silver particles or the fine silver alloy particles according to the present disclosure are fine silver particles. When the fine silver particles or the fine silver alloy particles according to the present disclosure are fine silver particles, the metallic luster as outward appearance can be further enhanced.

According to the decorative coating film according to the present disclosure, millimeter wave transmission properties can be ensured and/or maintained, even though the decorative coating film is continuously used.

DETAILED DESCRIPTION

1. Regarding Decorative Coating Film

Figure 1:
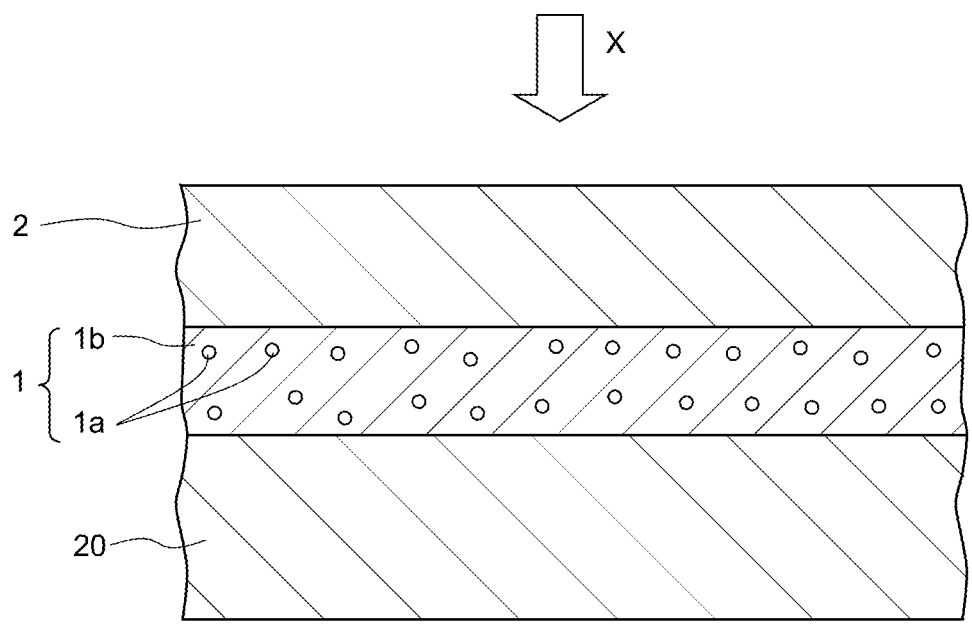
FIG. 1 is a schematic cross-sectional view showing a decorative coating film according to an embodiment of the present disclosure.
Figure 2:
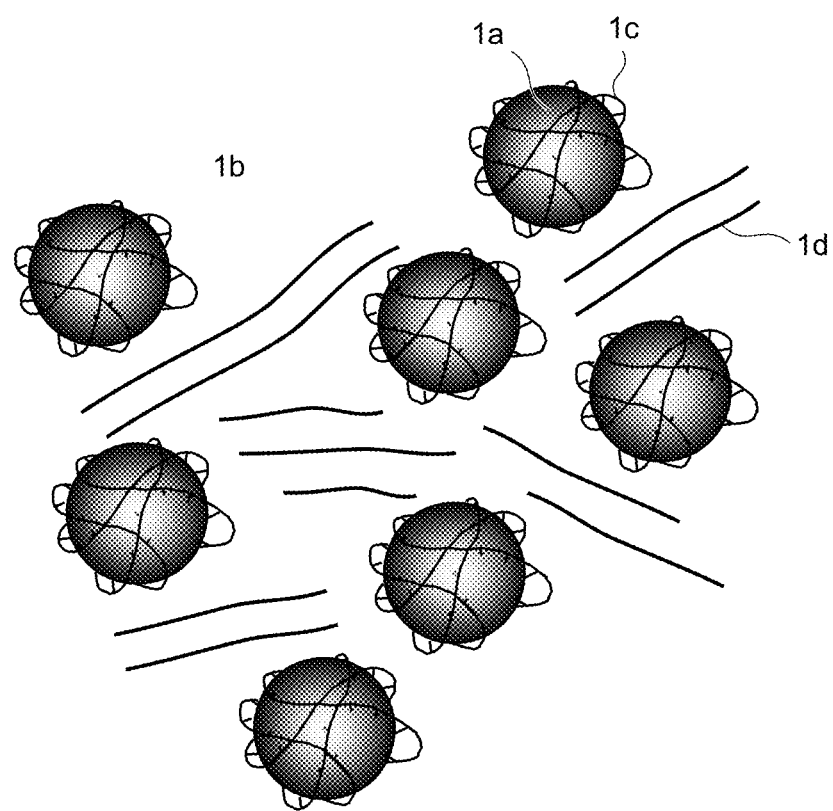
FIG. 2 is a schematic view showing a configuration of the decorative coating film shown in FIG. 1.
Figure 3:
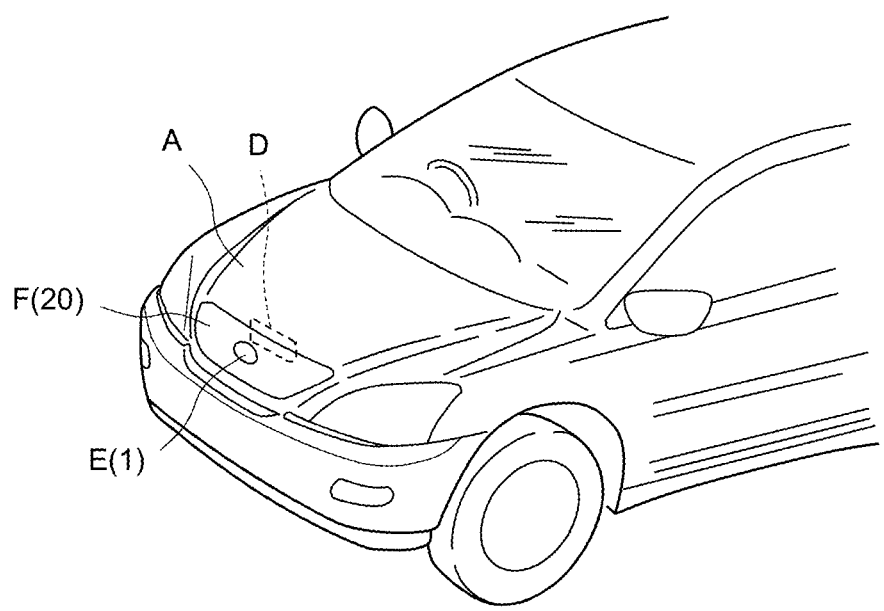
FIG. 3 is a schematic perspective view showing the relationship among a front grill (resin substrate) located forward of a vehicle, an emblem on the surface thereof, and a radar device disposed inside of the vehicle behind the resin substrate.
Figure 4:
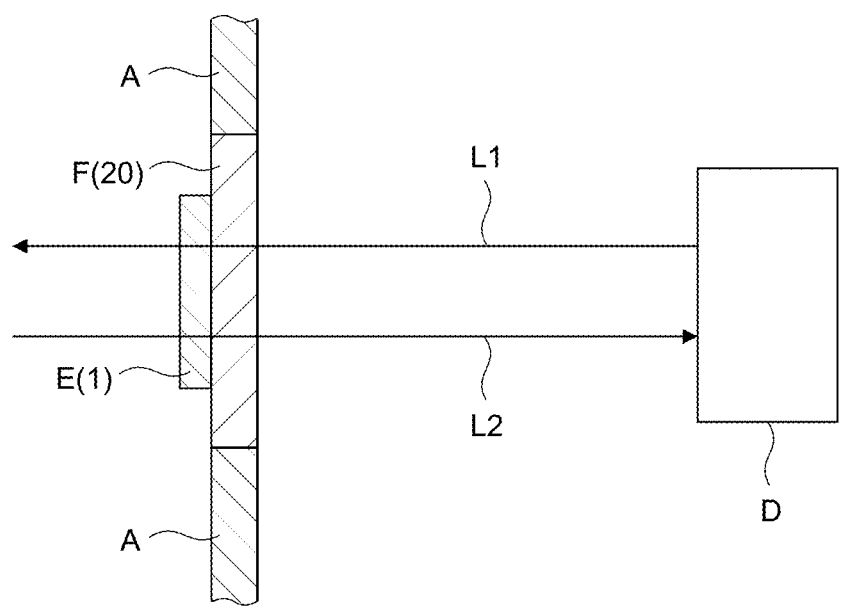
FIG. 4 is a schematic cross-sectional view showing the relationship among a front grill (resin substrate) located forward of a vehicle, an emblem on the surface thereof, and a radar device disposed inside of the vehicle behind the resin substrate.

FIG. 1 is a schematic cross-sectional view showing an embodiment of the decorative coating film of the present disclosure. FIG. 2 is a schematic view showing a configuration of the decorative coating film shown in FIG. 1. FIG. 3 and FIG. 4 are, respectively, a schematic perspective view and a schematic cross-sectional view each showing the relationship among a front grill (resin substrate) located forward of a vehicle, an emblem on the surface thereof, and a radar device disposed inside of the vehicle behind the resin substrate.

A decorative coating film 1 shown in FIG. 1 constitutes an emblem attached to the surface of a resin substrate 20 that is a front grill F. As shown in FIG. 3, a radar device D equipped forward of an automotive body A is disposed behind the front grill F. In the present embodiment, as shown in FIG. 4, a millimeter wave L1 irradiated from the radar device D is emitted forward, through the front grill F and the emblem E located on the surface thereof. The emitted millimeter wave L1 is reflected at an object such as a forward vehicle or a forward obstacle, and this reflected wave (millimeter wave L2) is turned to the radar device D through the emblem E and the front grill F. As such, the decorative coating film 1 (emblem) is formed on the surface of the resin substrate 20 positioned in the pathway of the radar device D.

Since the decorative coating film 1 is applied to the surface of the resin substrate 20 (front grill F) positioned in the pathway of the radar device, the decorative coating film 1 is a coating film having electrical wave transmission properties (electrical insulation properties), and also apparently having metallic luster.

Specifically, as shown in FIG. 1, a transparent resin coating film 2 may be further laminated on the decorative coating film 1 in a viewing direction (X direction). The decorative coating film 1 acts as a brightening layer and the resin coating film 2 acts as a protective layer of the decorative coating film 1. The resin coating film 2 may consist of a transparent polymeric resin, and may also be an adhesive seal to be adhered to the decorative coating film 1. Moreover, the resin coating film 2 may be attached to the decorative coating film 1 via a transparent adhesive agent or the like.

As shown in FIG. 2, the decorative coating film 1 comprises fine silver particles consisting of silver or fine silver alloy particles 1a, and nickel oxide having a wire shape 1d. The fine silver particles or fine silver alloy particles 1a, and the nickel oxide having a wire shape 1d are dispersed in the decorative coating film 1. The decorative coating film 1 further comprises a binding resin 1b having light transmission properties, which binds the fine silver particles or fine silver alloy particles 1a dispersed in the decorative coating film 1 with one another.

In some embodiments, the fine silver particles or fine silver alloy particles 1a and the nickel oxide having a wire shape 1d are dispersed in the state of primary particles (namely, in a state in which individual fine silver particles or fine silver alloy particles 1a and the nickel oxide having a wire shape 1d are separated from one another). In addition, around the fine silver particles or fine silver alloy particles 1a, a layer of protective agent (dispersant) 1c, which has been used as a raw material at the stage of producing the fine silver particles or fine silver alloy particles 1a, may be further formed.

In the after-mentioned method for producing the fine silver particles or fine silver alloy particles 1a, the mean particle diameter of the fine silver particles or fine silver alloy particles 1a can be controlled by, for example, adjusting the heating temperature and/or the heating time applied upon the production of the fine silver particles or fine silver alloy particles 1a, or selecting the type of the protective agent 1c.

In the after-mentioned method for producing the nickel oxide having a wire shape 1d, the shape of the nickel oxide can be controlled to be a wire shape by, for example, adjusting the pH of a reaction solution used upon the production of the nickel oxide having a wire shape 1d.

The fine silver particles consisting of silver or fine silver alloy particles 1a, which are comprised in the decorative coating film 1, are discontinuously dispersed. The nickel oxide having a wire shape 1d, the binding resin 1b, and the protective agent 1c, which are present around the fine silver particles or fine silver alloy particles 1a, are substances having electrical insulation. Accordingly, individual fine particles are electrically insulated from one another, and in some embodiments, individual fine silver particles or fine silver alloy particles 1a are electrically insulated.

Therefore, when an electrical wave is passed through the decorative coating film 1, the attenuation of the electrical wave (millimeter wave) is extremely small, and as a result, the decorative coating film 1 can be a coating film apparently having metallic luster, and also having favorable millimeter wave transmission properties.

Besides, in the present description, the term "millimeter wave" means an electrical wave having a frequency band of approximately 30 GHz to 300 GHz, among various types of electrical waves. The present millimeter wave can be specified, for example, by having a frequency band of approximately 76 GHz. Moreover, in the present description, the term "decorative coating film" means a constitutional element constituting the aforementioned emblem of a vehicle manufacturer or ornaments, which are specific to a vehicle, and the like. Specifically, with regard to the decorative coating film, an emblem or the like is formed on the surface of a front grill that is a resin substrate.

Moreover, with regard to a method of evaluating the millimeter wave transmission properties of an emblem assembly, an object is established between a transmitting antenna and a receiving antenna, which are faced to each other, and the millimeter wave transmission amount is then measured, and the attenuation degree is then evaluated by comparing the millimeter wave transmission amount with that in the case of not establishing the object.

In the present embodiment, with regard to the nickel oxide having a wire shape 1d, the aspect ratio (wire length/wire diameter) of the wire shape is 3 or more. In some embodiments, the aspect ratio of the wire shape is 50 or more. In some embodiments, the aspect ratio of the wire shape is 100 or more. In some embodiments, the wire diameter of the wire shape is 1 nm to 20 nm. In some embodiments, the wire diameter of the wire shape is 1 nm to 10 nm.

In the present embodiment, the aspect ratio of the wire shape can be measured, for example, using STEM (scanning transmission electron microscope). The nickel oxide having a wire shape includes nickel oxide having a thin wire shape. The nickel oxide having a thin wire shape cannot be confirmed if the magnification is decreased in STEM while the nickel oxide having a thin wire shape cannot be fit in the screen if the magnification is increased in STEM. Even in the case of such a nickel oxide having a thin wire shape, it is clear from STEM that the aspect ratio of the wire shape is in the above-described range.

The wire diameter of the wire shape can be measured, for example, using STEM. For instance, the wire diameter of the wire shape can be obtained by measuring the wire diameter of each of 10 or more nickel oxides having a wire shape, which have been randomly selected from the STEM image, and then calculating the mean value thereof.

In the present embodiment, by allowing the decorative coating film 1 to comprise the nickel oxide having a wire shape 1$d$, when compared with a decorative coating film that does not comprise the nickel oxide having a wire shape 1$d$, or a decorative coating film comprising nickel oxide having another shape instead of the nickel oxide having a wire shape 1$d$, the decorative coating film 1 is reinforced, and the transition and/or aggregation of the fine silver particles or fine silver alloy particles 1$a$ are suppressed, and the embrittlement of the binding resin 1$b$ is suppressed, so that the millimeter wave transmission properties of the decorative coating film 1 can be ensured and/or maintained without causing contact between the fine silver particles or fine silver alloy particles 1$a$ when the decorative coating film is continuously used.

Moreover, in the present embodiment, in decorative coating film 1, the amount of the nickel oxide having a wire shape 1$d$ ranges from 1.5% by mass to 35.0% by mass as nickel with respect to the mass of silver. In some embodiments, the amount of the nickel oxide having a wire shape 1$d$ ranges from 1.5% by mass to 10% by mass as nickel with respect to the mass of silver. By using the nickel oxide having a wire shape 1$d$ that satisfies the aforementioned range, the brightness (metallic luster) of the decorative coating film 1 can be ensured, and the millimeter wave transmission properties of the decorative coating film 1 can be ensured and/or maintained, even after the continued use thereof.

Herein, in the present embodiment, when the amount of the nickel oxide having a wire shape 1$d$ is less than 1.5% by mass as nickel with respect to the mass of silver, the brightness of the decorative coating film 1 can be ensured, but the millimeter wave transmission properties of the decorative coating film 1 are decreased due to the continued use thereof, as is apparent from the after-mentioned experiment conducted by the present inventors.

On the other hand, as the ratio of nickel to silver increases, the brightness of the decorative coating film tends to be decreased. When the amount of the nickel oxide having a wire shape 1$d$ is more than 35.0% by mass as nickel with respect to the mass of silver, the brightness of the decorative coating film 1 is decreased, and the metallic luster of the decorative coating film 1 is impaired, as is apparent from the after-mentioned experiment conducted by the present inventors.

When nickel oxide having another shape is used instead of the nickel oxide having a wire shape 1$d$, the decorative coating film is not effectively reinforced, and the millimeter wave transmission properties of the decorative coating film 1 are decreased due to the continued use thereof, as is apparent from the after-mentioned experiment conducted by the present inventors.

Herein, the millimeter wave transmission properties of the decorative coating film due to the continued use thereof, which are described in the present description, can be evaluated by measuring the millimeter wave transmission properties of the decorative coating film before and after performing a weathering test on the decorative coating film. The weathering test indicates an accelerated weathering test, in which outdoor exposure is simulated, using a xenon weather testing machine in accordance with JIS B 7764.

In the present embodiment, the mean particle diameter (mean primary particle diameter) of the fine silver particles or fine silver alloy particles 1$a$ is 2 to 200 nm. When the mean particle diameter of the fine silver particles or fine silver alloy particles 1$a$ is greater than 200 nm, irregular reflection of light is easily generated by the fine silver particles or fine silver alloy particles 1$a$, and this causes an easy reduction in the metallic luster of the decorative coating film 1. On the other hand, when the mean particle diameter of the fine silver particles or fine silver alloy particles 1$a$ is less than 2 nm, light made incident to the decorative coating film 1 is hardly reflected.

Herein, the term "fine particles" in the phrase "fine silver particles or fine silver alloy particles" used in the present description means "nanoparticles." Furthermore, the "nanoparticle" means a particle having a mean particle diameter from several nano-orders to several hundreds of nano-orders in the present description. An example of a method of measuring the particle diameter of a nanoparticle is a method comprising extracting fine silver particles or fine silver alloy particle in a predetermined range of an FE-SEM image or a TEM image from the image, and then obtaining a mean value of the diameters (diameter approximated as a circle) of these fine particles, which is then defined as a mean particle diameter thereof.

In general, since the mean particle diameter of the fine silver particles or fine silver alloy particles 1$a$ is a nano-order, the energy of the fine silver particles or fine silver alloy particles 1$a$ is easily amplified by a phenomenon called surface plasmon resonance absorption. As a result, a constitutional substance that is present around the fine silver particles or fine silver alloy particles 1$a$ receives such amplification energy, and thereby, the millimeter wave transmission properties of the decorative coating film 1 are easily decreased.

However, in the present embodiment, even if the mean particle diameter of the fine silver particles or fine silver alloy particles 1$a$ is in this range, the decorative coating film 1 is reinforced by comprising the nickel oxide having a wire shape 1$d$, and thus, even if the decorative coating film 1 is continuously used, the transition and/or aggregation of the fine silver particles or fine silver alloy particles 1$a$ are suppressed, and the embrittlement of the binding resin 1$b$ is suppressed, so that the millimeter wave transmission properties of the decorative coating film can be ensured and/or maintained without causing contact between the fine silver particles or fine silver alloy particles 1$a$.

Furthermore, in some embodiments, the crystallite diameter of the fine silver particles or fine silver alloy particles 1$a$ is in the range of 2 nm to 98 nm. Herein, when the crystallite diameter is less than 2 nm, light made incident to the decorative coating film 1 is hardly reflected. On the other hand, when the crystallite diameter is more than 98 nm, an electrical wave (electromagnetic wave) is hardly transmitted through the decorative coating film 1.

In some embodiments of the present disclosure, the fine silver particles or fine silver alloy particles 1$a$ are fine silver particles. When the fine silver particles or fine silver alloy particles 1$a$ are fine silver particles, the metallic luster as outward appearance can be further enhanced.

The binding resin 1$b$ is a polymeric resin having light transmission properties, and has electrical insulation. Examples of such a binding resin include an acrylic resin, a polycarbonate resin, a polyethylene terephthalate resin, an epoxy resin, and a polystyrene resin.

In some embodiments, as mentioned above, the binding resin 1b is a resin having an affinity with the protective agent 1c. For example, when an acrylic resin having a carbonyl group is used as a protective agent 1c, the same type of acrylic resin is selected as a binding resin.

Further, in some embodiments, the amount of the fine silver particles or fine silver alloy particles 1a comprised in the decorative coating film 1 as a whole is 83% by mass to 99% by mass. When the amount of the fine silver particles or fine silver alloy particles 1a is less than 83% by mass with respect to the mass of the decorative coating film 1 as a whole, the metallic luster caused by the fine silver particles or fine silver alloy particles 1a of the decorative coating film 1 may not be sufficient. On the other hand, when the amount of the fine silver particles or fine silver alloy particles 1a is more than 99% by mass with respect to the mass of the decorative coating film 1 as a whole, the adhesiveness to the resin substrate 20 caused by the binding resin 1b of the decorative coating film 1 may not be sufficient.

2. Method of Forming Decorative Coating Film 1

First, a colloidal solution of fine silver particles or fine silver alloy particles and nickel oxide having a wire shape is prepared.

In this production method, a reduction method in a liquid phase is applied. Specifically, a reducing solution having reducing ability has been prepared, and a protective agent (dispersant) has been dissolved in this reducing solution, as necessary. Subsequently, nickel in an ionic state (specifically, a nickel solution) and silver in an ionic state (specifically, a silver solution) are added to the reducing solution. Thereafter, the pH of the reaction solution is adjusted to be pH 6 to 12. In some embodiments, the pH of the reaction solution is adjusted to be pH 6 to 9. By adjusting the pH of the solution within the above-described range, the shape of nickel oxide can be controlled to a wire shape. Thereafter, the reaction solution is heated generally at 50° C. to 90° C. for 1 hour to 10 hours, so that silver is precipitated in the form of fine silver particles or fine silver alloy particles, and also, nickel is precipitated in the form of nickel oxide having a wire shape.

Herein, in a case where a protective agent is added, the growing speed of fine silver particles is controlled, so that the mean particle diameter of the fine silver particles is easily controlled. In some embodiments, a polymeric resin having high adhesiveness to fine silver particles and also having a good affinity with a binding resin added later is used as a protective agent.

By changing the contents of the added silver ions, and optionally, metallic ions constituting a silver alloy, and nickel ions, the composition ratio of silver to nickel oxide can be adjusted. In addition, the mean particle diameter of the fine silver particles or the fine silver alloy particles can be controlled by adjusting the heating temperature and the heating time. Moreover, as described above, the mean particle diameter of the fine silver particles or the fine silver alloy particles can also be controlled depending on the type of the protective agent.

Subsequently, unreacted matters are removed from the produced solution by filtration or the like, and the solvent is then replaced with a suitable solvent to prepare a colloidal solution. Then, a binding resin is added to the colloidal solution to obtain a paint used as a raw material for the decorative coating film. This paint is applied to the resin substrate 20, and is then heated, so that the decorative coating film 1 can be formed on the surface of the resin substrate 20.

Alternatively, the colloidal solution containing fine silver particles or fine silver alloy particles and nickel oxide having a wire shape may also be produced by preparing a solution containing fine silver particles or fine silver alloy particles and a solution containing nickel oxide having a wire shape, separately, then mixing the two solutions with each other, and then, optionally purifying the mixed solution.

EXAMPLES

Hereinafter, the present disclosure will be described based on the following examples.

Example 1

Figure 5:
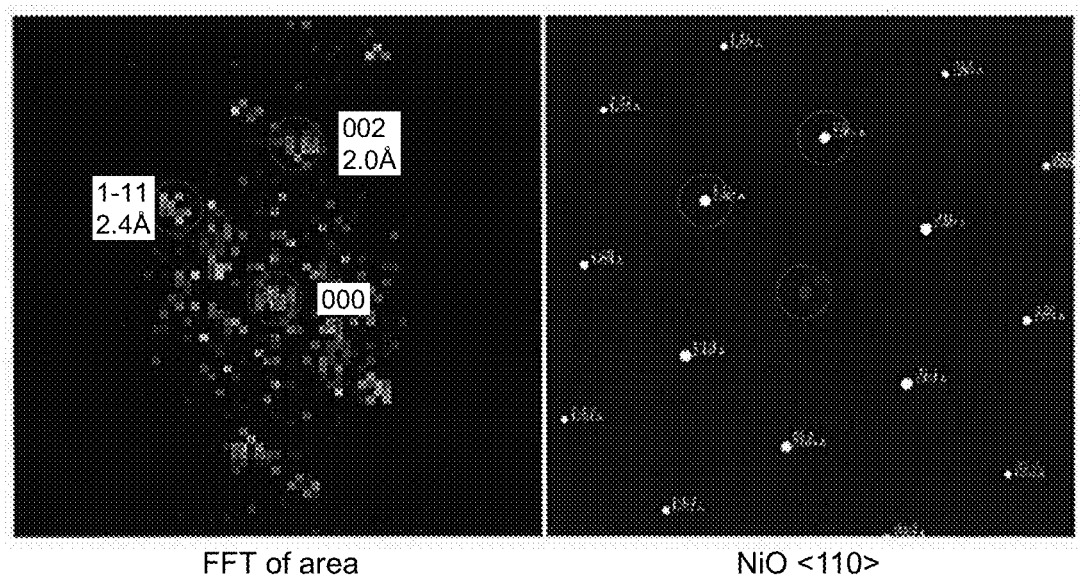
FIG. 5 includes photographs showing the results obtained by analyzing the crystal structure of the nickel oxide having a wire shape in the decorative coating film according to Example 1 by FFT.

15.9 g of DISPERBYK 190 (manufactured by BYK Japan K.K.) used as a protective agent was added to 597 g of N,N-dimethylaminoethanol used as a reducing agent, and thereafter, a solution prepared by dissolving 8.0 g of nickel nitrate and 220 g of silver nitrate in nitric acid was mixed with the obtained mixture. The thus obtained mixture was blended while being heated at 60° C. for 120 minutes, so that fine silver particles were precipitated. During this operation, by adjusting the amount of nitric acid for use in dissolution to control the pH of the reaction solution to pH 8, nickel oxide having a wire shape was also precipitated at the same time. Besides, the fact that the substance having a wire shape was nickel oxide was confirmed by performing a crystal structure analysis according to FFT, which is shown in FIG. 5.

The produced reaction solution was filtrated according to UF filtration at room temperature (25° C. to 30° C.) for 3 hours. The washing solution for use in the filtration was successively changed from pure water to ethanol, so as to obtain a colloidal solution comprising fine silver particles having a mean particle diameter (mean primary particle diameter) of 30 nm, and nickel oxide having a wire shape in an amount of 1.5% by mass as nickel with respect to the mass of silver (wherein the amount of nickel was an analytical value measured by ICP). Moreover, ethanol was replaced with 1-methoxy-2-propanol using an evaporator, so as to obtain a colloidal solution comprising 19% of a solid content (silver and nickel oxide).

It is to be noted that the solid content in the obtained colloidal solution was measured as follows.

First, a small aliquot was sampled from the colloidal solution and heated at 140° C. for 2 hours until the solvent was volatilized, and the residue in the colloidal solution was then measured. As a result, it was found that the residue accounted for 20% of the colloidal solution. Thereafter, an aliquot of the residue was heated to 500° C., using a thermogravimetric (TG measurement) apparatus, to burn organic components, so as to measure the solid content of the residue. As a result, it was found that the solid content of the residue accounted for 95% of the residue. As described above, the solid content in the colloidal solution was calculated to be 0.2×0.95×100=19%.

Next, to 300 g of the colloidal solution, a 1-methoxy-2-propanol solution comprising 8% by mass of a binding resin component (the amount of the binding resin: 57×0.08=4.56 g) with respect to the solid content in the colloidal solution (the amount of the solid: 300×0.19=57 g) was added, so as to produce a paint. Herein, as a binding resin, a two liquid mixed-type resin comprising an acrylic resin as a main skeleton and having a silane coupling bond was used.

Subsequently, the obtained paint was diluted with 1-methoxy-2-propanol or with any given thinner to obtain a mixture. The obtained mixture was applied to a transparent resin substrate, using a spray, and was then subjected to a heat treatment at 80° C. for 30 minutes, so as to form a decorative coating film.

Examples 2 and 3

A decorative coating film was formed in the same manner as that of Example 1. The difference from Example 1 was that the ratio of silver nitrate to nickel nitrate was changed in Examples 2 and 3, so that the amount of nickel oxide in the decorative coating film of Example 2 could be 2.0% by mass as nickel with respect to the mass of silver and the amount of nickel oxide in the decorative coating film of Example 3 could be 35.0% by mass as nickel with respect to the mass of silver.

Comparative Examples 1 to 3

A decorative coating film was formed in the same manner as that of Example 1. Comparative Example 1 was carried out to show the significance of addition of nickel oxide. Comparative Example 2 was carried out to determine the lower limit value of nickel to silver. Comparative Example 3 was carried out to determine the upper limit value of nickel to silver.

Comparative Examples 1 to 3 were different from Example 1 in the following points. In Comparative Example 1, nickel nitrate was not added. In Comparative Examples 2 and 3, the ratio of silver nitrate to nickel nitrate was changed, so that the amount of nickel oxide in the decorative coating film of Comparative Example 2 could be 1.0% by mass as nickel with respect to the mass of silver and the amount of nickel oxide in the decorative coating film of Comparative Example 3 could be 40.0% by mass as nickel with respect to the mass of silver.

Comparative Example 4

Using a paint synthesized by a method other than the above-described preparation method, a decorative coating film was formed. Comparative Example 4 was carried out to compare the properties of a decorative coating film comprising fine silver particles and nickel oxide having a shape other than a wire shape, with the properties of the decorative coating films of Examples 1 to 3, comprising fine silver particles and nickel oxide having a wire shape.

Differing from Example 1, the decorative coating film of Comparative Example 4 comprises, instead of the nickel oxide having a wire shape, nickel oxide not having such a wire shape, in which shapes with a size of approximately 50 nm, such as spherical, polyhedral and platy shapes, are present, in an amount of 1.5% by mass as nickel with respect to the mass of silver in the decorative coating film.

[Microscopic Observation]

Figure 6:
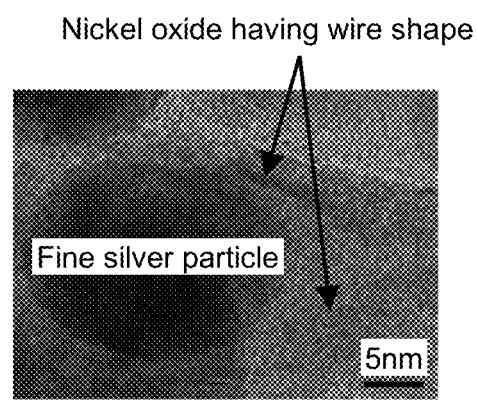
FIG. 6 is a photograph showing the results of a STEM (scanning transmission electron microscope) analysis performed on the fine silver particles and nickel oxide in the decorative coating film according to Example 1.
Figure 7:
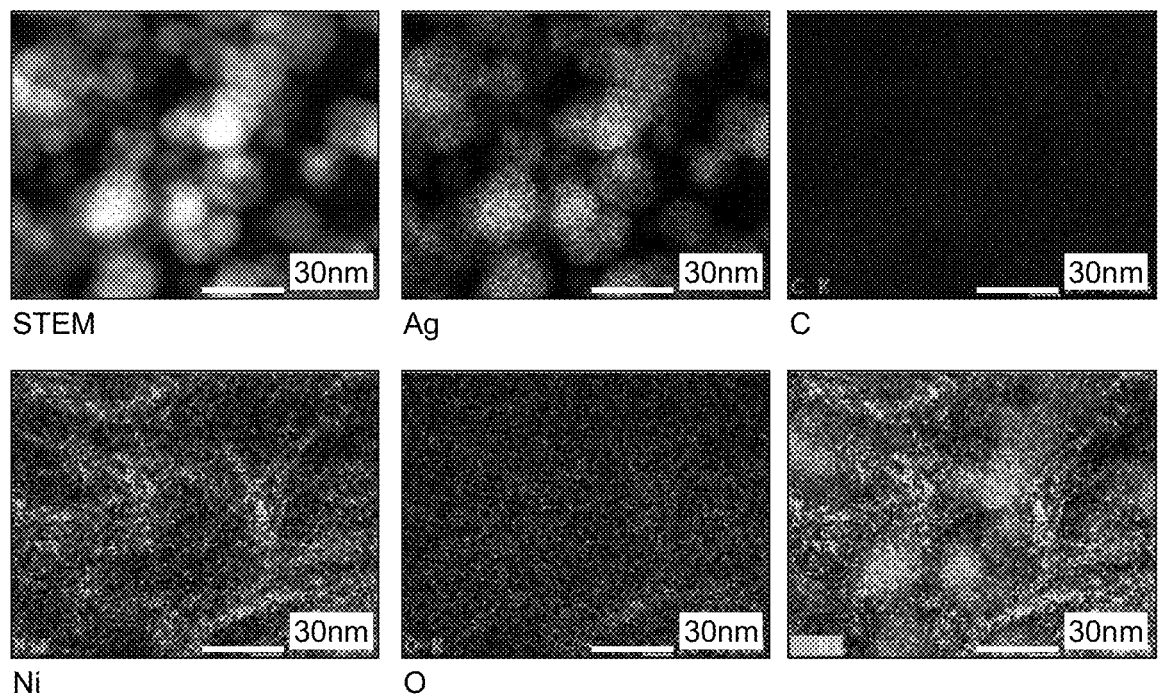
FIG. 7 includes photographs showing distribution of silver, carbon, oxygen and nickel in the decorative coating film according to Example 1 by an EDX mapping analysis.
Figure 8:
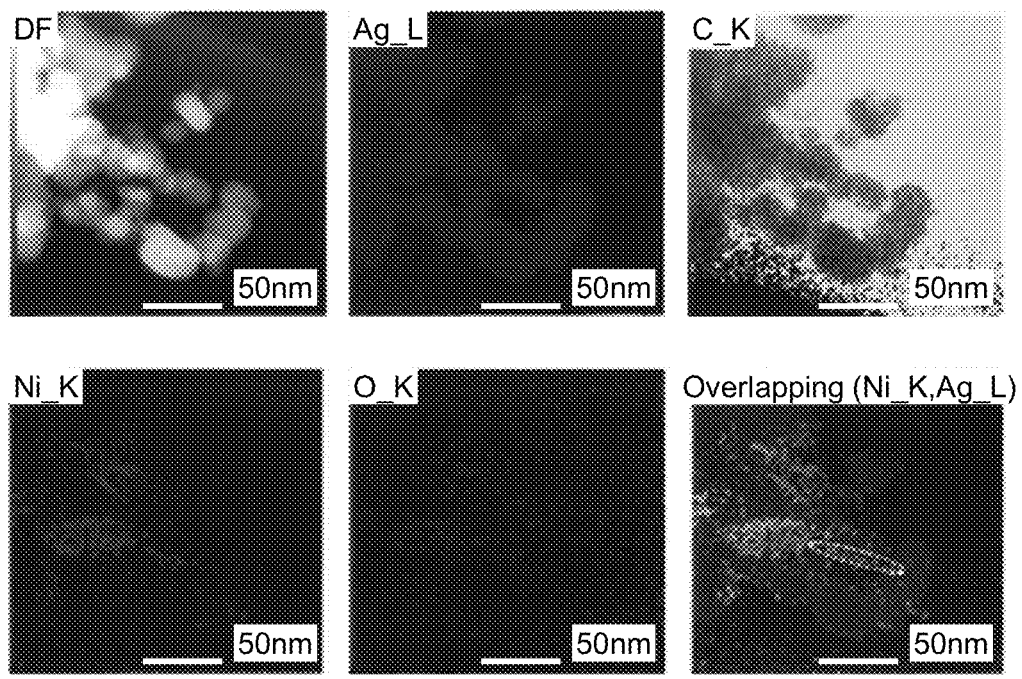
FIG. 8 includes photographs showing distribution of silver, carbon, oxygen and nickel in the decorative coating film according to Comparative Example 4 by an EDX mapping analysis.

The aspect ratio of the wire shape (wire length/wire diameter) and the wire diameter of the obtained nickel oxide having a wire shape in the decorative coating film according to Example 1 were examined using a scanning transmission electron microscope (STEM). The results are shown in FIG. 6. Moreover, according to energy-dispersive X-ray spectroscopy (EDX) using a scanning transmission electron microscope (STEM), distribution of silver, carbon, oxygen and nickel, as well as the aspect ratio of the wire shape and the wire diameter of the nickel oxide having a wire shape in the decorative coating film according to Example 1 were examined. The results are shown in FIG. 7. FIG. 7 includes photographs showing distribution of silver, carbon, oxygen and nickel in the decorative coating film according to Example 1. In FIG. 7, the upper left photograph is a photograph taken using STEM; the upper center photograph shows distribution of silver in the decorative coating film by EDX; the upper right photograph shows distribution of carbon in the decorative coating film by EDX; the lower left photograph shows distribution of nickel in the decorative coating film by EDX; the lower center photograph shows distribution of oxygen in the decorative coating film by EDX; and in each photograph, a light color portion corresponds to each element. In addition, the lower right photograph shows the overlapping of the distributions of silver and nickel in the decorative coating film by EDX. As a control, FIG. 8 includes photographs showing distribution of silver, carbon, oxygen and nickel in the decorative coating film according to Comparative Example 4 by an EDX mapping analysis. In FIG. 8, the upper left photograph is a photograph taken using STEM; the upper center photograph shows distribution of silver in the decorative coating film by EDX; the upper right photograph shows distribution of carbon in the decorative coating film by EDX; the lower left photograph shows distribution of nickel in the decorative coating film by EDX; the lower center photograph shows distribution of oxygen in the decorative coating film by EDX; and in each photograph, a light color portion corresponds to each element. In addition, the lower right photograph shows the overlapping of the distributions of silver and nickel in the decorative coating film by EDX.

[Weathering Test (Sunshine Test)]

A weathering test (sunshine test) was performed on the decorative coating films according to Examples 1 to 3 and Comparative Examples 1, 2 and 4, using a xenon weather testing machine in accordance with JIS B 7764. Thereafter, the millimeter wave transmission properties of the decorative coating films according to Examples 1 to 3 and Comparative Examples 1, 2 and 4 were measured before and after the weathering test, and thereafter, the millimeter wave attenuation-increasing percentage was calculated. Moreover, the initial lightness $L^*$ of each of the decorative coating films according to Examples 1 to 3 and Comparative Examples 1 to 4, which is specified by the color system ($L^*$, $a^*$, $b^*$) of CIE 1976 color system (JIS Z 8729), was measured using a color difference meter (CR400, manufactured by Konica Minolta).

Figure 9:
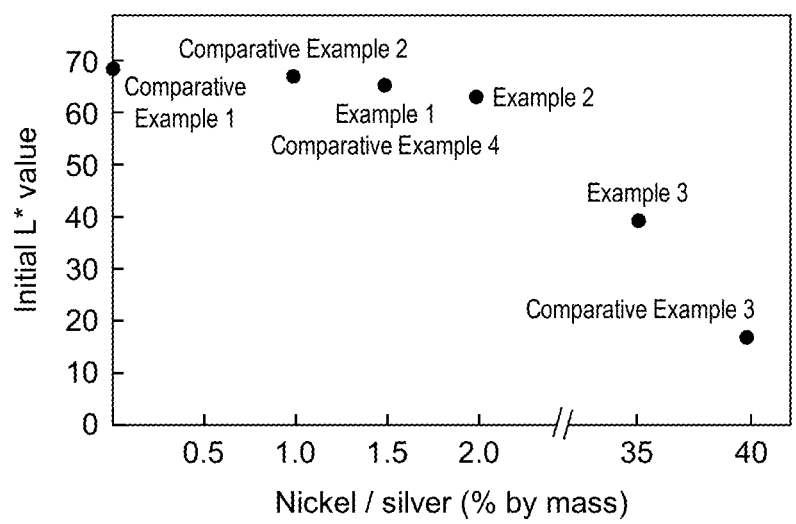
FIG. 9 is a graph showing the relationship between the mass ratio of nickel to silver (nickel/silver) according to Examples 1 to 3 and Comparative Examples 1 to 4, and the initial L* value (before a weathering test) of each of the decorative coating films comprising such nickel.
Figure 10:
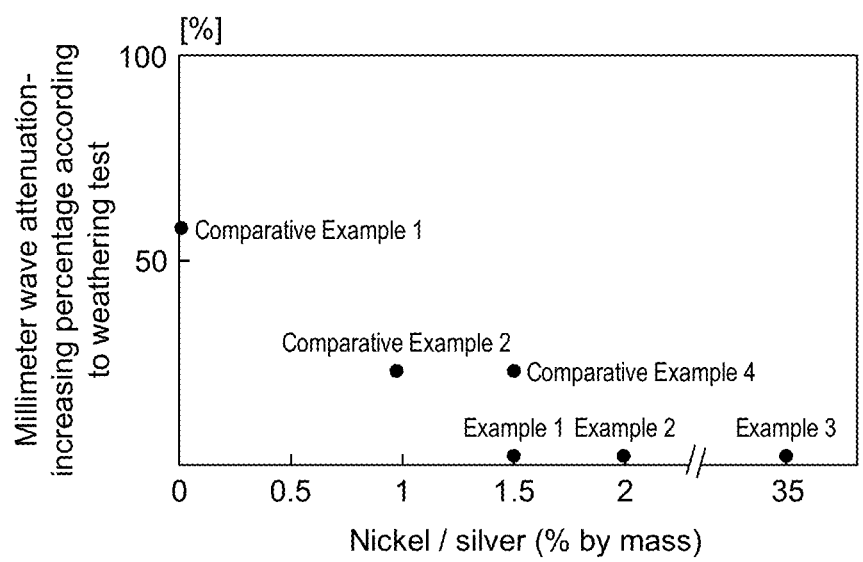
FIG. 10 is a graph showing the relationship between the mass ratio of nickel to silver (nickel/silver) according to Examples 1 to 3 and Comparative Examples 1, 2 and 4, and the millimeter wave attenuation-increasing percentage of each of the decorative coating films comprising such nickel due to a weathering test.
Figure 11A:
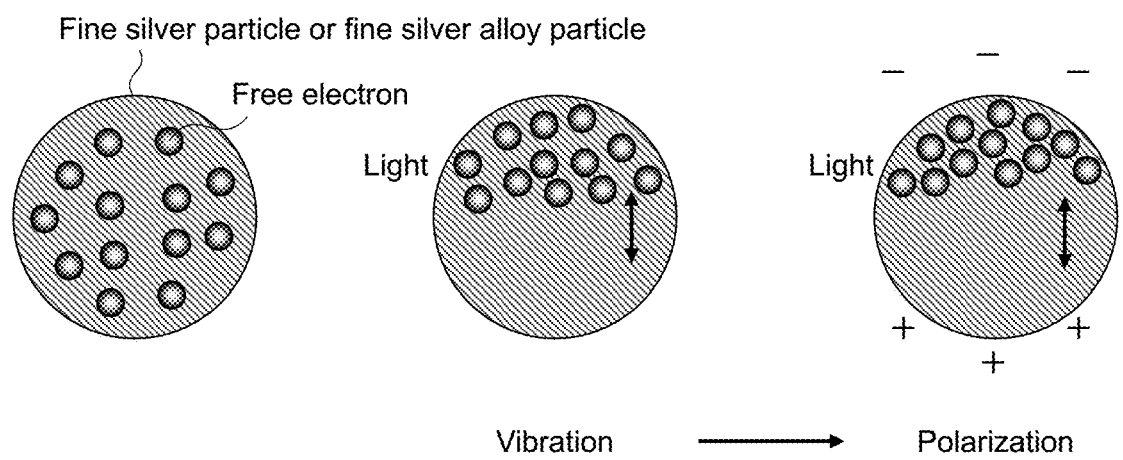
FIG. 11A is a schematic view showing a state in which fine silver particles or fine silver alloy particles are polarized by light.
Figure 11B:
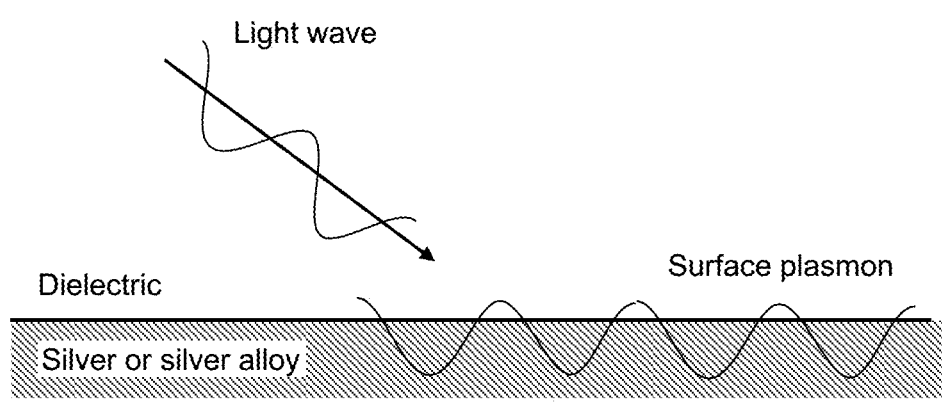
FIG. 11B is a schematic view showing surface plasmon resonance absorption.

FIG. 9 is a graph showing the relationship between the mass ratio of nickel to silver (nickel/silver) according to Examples 1 to 3 and Comparative Examples 1 to 4, and the initial $L^*$ value (before a weathering test) of each of the decorative coating films comprising such nickel. FIG. 10 is a graph showing the relationship between the mass ratio of nickel to silver (nickel/silver) according to Examples 1 to 3 and Comparative Examples 1, 2 and 4, and the millimeter wave attenuation-increasing percentage according to a weathering test of each of the decorative coating films comprising such nickel.

[Result 1: Regarding Fine Silver Particles and Nickel Oxide]

As shown in FIGS. 6 and 7, the nickel oxide of Example 1 had a wire shape. In the nickel oxide having a wire shape shown in FIGS. 6 and 7, the length of the wire shape was 100 nm to 250 nm, the wire diameter was 5 nm, and the aspect ratio was 20 to 50. The nickel oxide having a wire shape included nickel oxide having a thin wire shape. The nickel oxide having a thin wire shape could not be confirmed if the magnification was decreased in STEM while the nickel oxide having a thin wire shape could not be fit in the screen if the magnification was increased in STEM. Even in the case of such nickel oxide having a thin wire shape, it was clear that the aspect ratio of the wire shape was 3 or more. Moreover, as shown in FIG. 7, the fine silver particles and the nickel oxide were uniformly dispersed in the decorative coating film. As shown in FIG. 8, in Comparative Example 4, nickel oxide with a size of approximately 50 nm, which did not have a wire shape, was distributed.

[Result 2: Regarding Lower Limit Value of the Ratio of Nickel Oxide Having Wire Shape]

When the decorative coating films according to Examples 1 and 2 were compared with the decorative coating films according to Comparative Examples 1, 2 and 4, the initial L* values were at the same level, as shown in FIG. 9. In addition, the initial L* values of Example 1 and Comparative Example 4 were the same values. However, as shown in FIG. 10, although the millimeter wave attenuation-increasing percentages according to the weathering test of the decorative coating film of Comparative Example 1, which did not comprise nickel oxide having a wire shape, and the decorative coating film of Comparative Example 2 comprising nickel oxide having a wire shape in an amount of 1.0% by mass as nickel with respect to the mass of silver, were increased, the millimeter wave attenuation-increasing percentages according to the weathering test of the decorative coating film of Example 1 comprising nickel oxide having a wire shape in an amount of 1.5% by mass as nickel with respect to the mass of silver, the decorative coating film of Example 2 comprising nickel oxide having a wire shape in an amount of 2.0% by mass as nickel with respect to the mass of silver, and the decorative coating film of Example 3 comprising nickel oxide having a wire shape in an amount of 35.0% by mass as nickel with respect to the mass of silver, were not changed.

This is considered because the decorative coating films according to Examples 1 to 3 comprised a larger amount of nickel oxide having a wire shape than the decorative coating films of Comparative Examples 1 and 2, and thus, the decorative coating films of Examples 1 to 3 were further reinforced. Thereby, it is considered that transition and/or aggregation of fine silver particles or fine silver alloy particles were suppressed, and that the millimeter wave transmission properties of the decorative coating films could be ensured and/or maintained without causing contact between the fine silver particles or the fine silver alloy particles, even in the state of fine silver particles or fine silver alloy particles easily generating surface plasmon resonance absorption. In view of the foregoing, it is considered that the millimeter wave transmission properties of the decorative coating films can be ensured and/or maintained if the content of the nickel oxide having a wire shape in the decorative coating film is 1.5% by mass or more as nickel with respect to the mass of silver.

[Result 3: Regarding Upper Limit Value of Ratio of Nickel Oxide Having Wire Shape]

As shown in FIG. 9, as the content of nickel increases, the initial L* value of the decorative coating film tends to be decreased. The initial L* values of the decorative coating films according to Examples 1 to 3 were higher than that of the decorative coating film according to Comparative Example 3, and metallic luster was observed in the decorative coating film of Example 3. In contrast, in the decorative coating film according to Comparative Example 3, metallic luster was impaired. This is considered because metallic luster derived from fine silver particles of Comparative Example 3 was impaired since the decorative coating film according to Comparative Example 3 comprised a larger amount of nickel oxide. From these results, it is found that the brightness of the decorative coating film can be ensured, and the metallic luster of the decorative coating film can be maintained if the content of the nickel oxide in the decorative coating film is 35.0% by mass or less as nickel with respect to the mass of silver.

[Result 4: Regarding Shape of Nickel Oxide]

As shown in FIG. 10, the millimeter wave attenuation-increasing percentage according to the weathering test of the decorative coating film according to Comparative Example 4 was larger than that of the decorative coating film of Example 1. When the decorative coating film according to Example 1 was compared with the decorative coating film according to Comparative Example 4, the two decorative coating films were identical to each other in that their content of nickel was the same, but the two decorative coating films were different from each other in that the decorative coating film according to Example 1 comprised nickel oxide having a wire shape, whereas the decorative coating film according to Comparative Example 1 comprised nickel oxide having a shape other than the wire shape. In the view of the foregoing, it is considered that the decorative coating film was more effectively reinforced by the nickel oxide having a wire shape, and that the millimeter wave transmission properties of the decorative coating film could be ensured and/or maintained. It is considered that when the shape of nickel oxide was not a wire shape, the decorative coating film was not effectively reinforced, and thus that the millimeter wave transmission properties of the decorative coating film could not be ensured and/or maintained even if the content of nickel oxide in the decorative coating film was 1.5% by mass as nickel with respect to the mass of silver, after the decorative coating film had been continuously used.

As given above, the embodiments of the present disclosure are described in detail using drawings. However, specific configurations are not limited to these embodiments, and even if design modifications are carried out in a range that is not deviated from the gist of the present disclosure, such modifications are included in the present disclosure.

All publications, patents and patent applications cited in the present description are herein incorporated by reference as they are.

DESCRIPTION OF SYMBOLS

1 DECORATIVE COATING FILM
1a FINE SILVER PARTICLES OR FINE SILVER ALLOY PARTICLES
1b BINDING RESIN
1c PROTECTIVE AGENT (DISPERSANT)
1d NICKEL OXIDE HAVING WIRE SHAPE
2 RESIN COATING FILM
20 RESIN SUBSTRATE
A AUTOMOTIVE BODY
F FRONT GRILL (RESIN SUBSTRATE)
E EMBLEM (DECORATIVE COATING FILM)
D RADAR DEVICE
L1 IRRADIATED MILLIMETER WAVE
L2 REFLECTED MILLIMETER WAVE

What is claimed is:

1. A system, comprising:
a radar device configured to emit a beam of millimeter waves; and a resin substrate having a surface positioned in a pathway of the beam,
wherein a decorative coating film is formed on the surface of the resin substrate,
the decorative coating film comprises:
   silver particles or silver alloy particles;
   nickel oxide; and
   a binding resin having light transmission properties, which binds the silver particles or the silver alloy particles dispersed in the decorative coating film with one another,
a shape of the nickel oxide is a wire shape,
the silver particles or silver alloy particles have a mean particle diameter of 2 to 200 nm, and
a length of the wire shape of the nickel oxide is 100 to 250 nm.

2. The system according to claim 1, wherein an aspect ratio of the wire shape is 3 or greater, and a diameter of the wire shape is 1 nm to 20 nm.

3. The system according to claim 1, wherein the fine silver particles or the silver alloy particles are silver particles, and an amount of the nickel oxide is 1.5% by mass to 35.0% by mass as nickel with respect to a mass of silver.

4. The system according to claim 1, wherein an aspect ratio of the wire shape is 50 or greater.

5. The system according to claim 1, wherein an aspect ratio of the wire shape is 100 or greater.

6. The system according to claim 1, wherein a diameter of the wire shape is 1 nm to 10 nm.

7. The system according to claim 1, wherein a crystallite diameter of the silver particles or silver alloy particles is 2 nm to 98 nm.

8. The system according to claim 1, wherein the binding resin comprises one selected from the group consisting of an acrylic resin, a polycarbonate resin, a polyethylene terephthalate resin, an epoxy resin, and a polystyrene resin.

9. The system according to claim 1, wherein an amount of the silver particles or silver alloy particles in the decorative coating film is 83% by mass to 99% by mass when a total mass of the decorative coating film is considered 100 mass %.

10. The system according to claim 1, wherein the resin substrate is a portion of a grill of an automobile.

11. The system according to claim 1, wherein the binding resin is a polymeric resin having electrical insulation.

* * * * *